Sept. 18, 1951 V. VLTAVSKY 2,568,042
HYDRAULIC PRESS
Filed Dec. 22, 1947
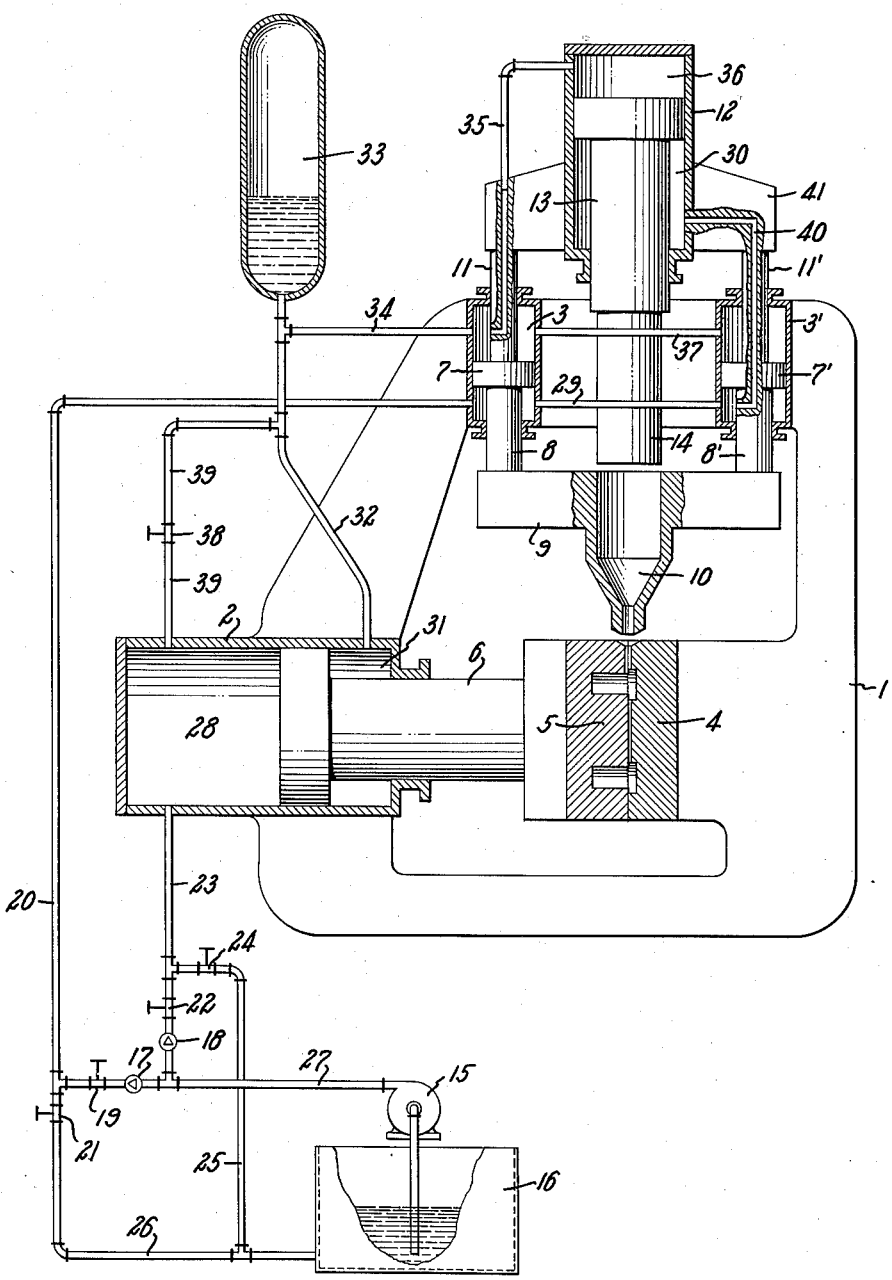
INVENTOR:
Vladimír Vltavský,
BY:
Pierce, Scheffler & Parker
Attorneys.

Patented Sept. 18, 1951

2,568,042

UNITED STATES PATENT OFFICE 2,568,042

HYDRAULIC PRESS

Vladimír Vltavský, Prague, Czechoslovakia

Application December 22, 1947, Serial No. 793,069
In Germany December 30, 1941

Section 1, Public Law 690, August 8, 1946
Patent expires December 30, 1961

5 Claims. (Cl. 18—30)

This invention relates to a hydraulic press for the manufacture of pressed synthetic materials, more particularly thermoplastic material, by die-casting in moulds. For this purpose divided moulds are used, which are pressed together by a hydraulic piston, whereupon by means of a second piston the material which has in the meantime become plastic is squirted into the mould. The heating of the material takes place in the pressure chamber which before the actual squirting operation must be pressed against the already closed mould. This pressing of the chamber against the mould has hitherto been effected through the pressure chamber being connected with the die-casting piston by means of elastic connecting members and being carried along during the motion of the squirting piston, until it bears against the mould, only after which the piston could enter the pressure chamber.

The constructional arrangement of this installation was rather complicated and was unreliable in operation. For overcoming this disadvantage the present invention provides, that for pressing the pressure chamber against the mould pressure cylinders are employed, which are actuated simultaneously with the injection piston and automatically bring the injection chamber against the mould before the injection commences and remove it again after the completion of the injection.

A constructional example of the invention is illustrated in the accompanying drawing which represents a diagram of the whole arrangement.

The machine consists of the frame 1, on which are mounted the cylinder 2 for closing the mould 4, 5 and the two cylinders 3, 3' for pressing the pressure chamber 10 against the mould. To the frame is also fixed the immovable part 4 of the mould which is arranged for the injection to be performed through the mould joint. The other half 5 of the mould is supported by the differential piston 6 of the mould closing cylinder.

In the pressure-applying cylinders 3, 3' are disposed the two plate-like pistons 7, 7', the lower piston rods 8, 8' of which support the transverse beam 9 with the pressure chamber 10, whilst the upper piston rods 11, 11' support by means of the transverse beam 41 the pressure cylinder 12 with the differential piston 13 and the actual injection piston 14.

As will be seen, the parts 8, 8', 9, 10, 11, 11', 41 and 12 form one unit with the pistons 7, 7' and move upwards and downwards, when the pressure-applying cylinders are put in operation, the downward stroke being limited by the pressure chamber 10 bearing against the mould 4, 5 and the upward stroke by connections which are not shown.

The press is driven by the pump 15 which forces the pressure medium (usually oil) out of the container 16 into the pipe 27 and from there by way of the non-return valves 17 and 18 and the control valves 19, 22 into the pipes 20 and 23. Through the pipe 23 the mould-closing cylinder 2 is fed, whilst the pipe 20 leads in the first place to the two pressure-applying cylinders 3, 3' and from these cylinders (preferably in the piston rod 11') by way of the pipe 40 to the press cylinder 12. By means of the valves 21 and 24 the pipes 20 and 23 respectively can be connected by way of the pipes 26 and 25 respectively to the container 16 and be relieved of pressure.

The space 31 behind the piston of the mould-closing cylinder 2 is connected by means of the pipe 32 to the pressure accumulator 33 which is also connected to the pressure space of the pressure-applying cylinders 3, 3' by means of the pipes 34, 37. Through the pipe 35, preferably disposed in the piston rod 11, the interior of the accumulator is then also connected to the pressure space 36 of the press cylinder 12.

The pressure accumulator 33 is fed by means of the pipe 39 by opening the valve 38 from the pressure space 28 of the mould-closing cylinder 2. When the accumultor is to be replenished, the valve 38 is opened while the cylinder 2 is under pressure; on the other hand, when the pressure in the accumulator is to be reduced, the valve 38 is opened while the pressure space 28 is connected to the container 16. In this way it is possible to regulate to any desired pressure up to a certain amount corresponding to the ratio of the surfaces of the differential piston 6.

The described arrangement operates in the following manner:

The pump 15 maintains in the pipe 27 the requisite working pressure. The valve 19 is open, whilst the valve 21 is closed. These two valves, as also the two valves 22, 24 are actuated simultaneously, for instance by foot-operated levers, in such a manner that one is opened, while the other is closed, and vice versa. The pressure medium keeps the two pressure-applying pistons 7, 7' and the press piston 13 in the raised position. At the same time the valve 24 is open, whilst the valve 22 is closed. The space 28 of the mould-closing cylinder 2 is therefore not under pressure.

Although the pressure medium of the pressure accumulator 33 presses against the upper surfaces of the pressure-applying pistons 7, 7' and of the press piston 13, it cannot overcome the full pressure in the space 30 and the lower spaces of the cylinders 3, 3'. The differential piston 6 of the mould-closing cylinder 2 is forced by the accumulator pressure into the left hand extreme position.

On the valve 24 being closed and the valve 22 at the same time opened, the pressure medium is forced by the pump 15 into the pressure space 28 and the differential piston 6 displaced to the right, causing the mould 4, 5 to close. The pressure in the pipe 20 is for the time being maintained.

Thereupon, the valve 19 is closed and the valve 21 at the same time opened. The lower spaces of the cylinders 3, 3' and 12 are thus relieved of pressure and the pistons 7, 7' and 13 are forced downwards by the accumulator pressure. At the same time the pressure chamber 10 is pressed against the mould 4, 5, whereupon the injection piston 14 commences to enter the injection chamber 10. This initiates the actual injection operation.

After the completion of the injection the operation is reversed: The valve 21 is closed and the valve 19 is opened. The full pressure of the pump 15 acts on the lower surfaces of the pistons 7, 7' and 13. The pressure chamber 10 is thereby first lifted off the mould 4, 5 and thereupon the injection piston 14 is withdrawn out of the chamber 10. During this motion the pressure medium is forced back out of the upper cylinder spaces into the pressure accumulator 33, so that the latter is always automatically kept charged. Through opening the valve 24 and closing the valve 22 the pressure space 28 of the mould-closing cylinder is also relieved of pressure and through the pressure in the accumulator the piston 6 is forced again to the left, thereby causing the mould 4, 5 to open.

The dimensions of the effective pressure surfaces and of the piston rods of the pistons in the individual cylinders are made such that the pressure exerted by the pump 15 will overcome the accumulator pressure in the cylinders. A rapid opening of the mould and a rapid injection of the material to be pressed is thus obtained, whilst the closing of the mould and the lifting of the press cylinder is effected by means of the pressure fluid out of the pump. When a multi-stage pump is employed or when the mould-closing cylinder is previously filled, it is possible with the described arrangement greatly to increase the rate at which work can be turned out, even with a relatively small pump and a low consumption of energy, since the return motion of the pressure chamber, which then alone determines the size of the pump, can take place slowly, more particularly in the case of large presses.

What I claim is:

1. An injection molding press comprising a supporting frame, a molding die carried by said frame, a pressure cylinder mounted on said frame opposite said die, a double-acting piston in said cylinder, a companion die carried by said piston and movable thereby into and out of engagement with said first mentioned die, a pair of pressure cylinders mounted on said frame, strain rods extending through said cylinders and having double acting pistons thereon operating in said cylinders, an injection cylinder carried by said strain rods at one end thereon and facing said dies, a pressure cylinder carried by said strain rods at the other ends thereof, a double acting piston in said last cylinder and which carries an injection plunger for said injection cylinder, a source of fluid pressure, and fluid pressure connections to opposite ends of each of said cylinders arranged successively to shift the movable die into closing position, move said injection cylinder into engagement therewith and move the plunger into the injection cylinder, and to reverse the sequence for a complete molding cycle.

2. An injection molding press according to claim 1 in which the fluid pressure connections to the pressure cylinder for the injection plunger include the cylinders of the strain rod pistons.

3. An injection molding press according to claim 2 in which the strain rods are provided with passages opening into the cylinders thereof for conducting fluid pressure from said cylinders to the pressure cylinder of the injection plunger.

4. An injection molding press according to claim 1 in which an accumulator is provided for supplying pressure fluid to the cylinders of the strain rod pistons and injection plunger for advancing them to molding position and the pressure fluid for retracting the same is supplied directly from said pump.

5. An injection molding press according to claim 4 in which the accumulator is likewise connected to supply fluid pressure to retract the mold closing piston and the pump is connected to supply closing pressure thereto.

VLADIMÍR VLTAVSKÝ.

REFERENCES CITED

The following references are of record in the file of this patent:

UNITED STATES PATENTS

| Number | Name | Date |
| --- | --- | --- |
| 2,088,134 | Haessler | July 27, 1937 |
| 2,273,516 | Dinzl | Feb. 17, 1942 |
| 2,327,227 | Tucker | Aug. 17, 1943 |
| 2,333,056 | Thoreson et al. | Oct. 26, 1943 |
| 2,334,372 | Abott et al. | Nov. 16, 1943 |
| 2,360,000 | Lawyer | Oct. 10, 1944 |

FOREIGN PATENTS

| Number | Country | Date |
| --- | --- | --- |
| 234,631 | Switzerland | Feb. 1, 1945 |